Patented June 12, 1945

2,378,247

UNITED STATES PATENT OFFICE 2,378,247

CONCENTRATED LIQUID HARDENERS AND PROCESS FOR PREPARING

Harold D. Russell, Rochester, N. Y., assignor to Eastman Kodak Company, Rochester, N. Y., a corporation of New Jersey No Drawing. Application February 27, 1942, Serial No. 432,720

5 Claims. (Cl. 95—88)

This invention relates to concentrated liquid hardeners and in particular to concentrated liquid hardeners which are substantially free of tendency to form incrustations and precipitates.

Satisfactory hardening formulas containing alum, boric acid, acetic acid, sodium sulfite, etc., are known and when added to a fixing bath they impart good hardening properties without tendency to sludge. Attempts have been made to prepare such hardeners in concentrated form so that small amounts of the concentrate could be used to prepare a hardening bath, fixing bath, etc., and impart satisfactory hardening properties thereto. However, until the advent of this invention, satisfactory hardener concentrates have not been prepared. With such a complex mixture of substances complicated reactions take place and cause formation of incrustations on the container and precipitation of solid matter. With hardeners containing boric acid this difficulty of precipitation has been particularly great. Furthermore, the concentrated hardeners of the prior art were insufficiently concentrated to be practical and attempts to prepare them in higher concentration merely increased the incrustation and precipitation problems.

This invention has for its object to overcome the foregoing difficulties. Another object is to provide a concentrated liquid hardener which is relatively free of the tendency to form incrustations and precipitates. A still further object is to provide a liquid acid hardener concentrate having a high hardening potency. A still further object is to provide a liquid acid hardener concentrate containing boric acid which is relatively free of the tendency to form incrustations and precipitates over prolonged periods of time. Other objects will appear hereinafter.

These and other objects are accomplished by my invention which includes a solution of an hydroxy aliphatic amine, a boron compound, and an aluminum salt having hardening properties, all of these substances being present in the concentrate in sufficient concentration that relatively small amounts of the concentrate can be added to an aqueous photographic bath to impart satisfactory hardening properties thereto. I have found that hydroxy aliphatic amines effectively dissolve the necessary amounts of substances for a concentrated hardener and that such solutions do not form precipitates or incrustations over relatively long periods of time.

In the following examples and description I have given several of the preferred embodiments of my invention, but it is to be understood that these are set forth for the purpose of illustration and not in limitation thereof.

Examples of satisfactory hydroxy aliphatic amines (including cyclo aliphatic amines) are morpholine, ethanolamine, 2-amino butanol, beta diethylamino ethyl alcohol, diethanol amine, triethanol amine, 2-amino-2-methyl-1-propanol, 2 - amino-2-methyl - 1-3 - propandiol. The primary hydroxy aliphatic amines are preferred in some cases since they tend to increase the rate of fixation when the hardener concentrate is added to the fixing bath.

In order to obtain a satisfactory hardener it is now realized that a boron compound is an essential constituent. Therefore, boron compounds are incorporated in the concentrated hardener. Examples of such substances are boric acid, boric anhydride, glycerol bori-borates (formed by adding boric acid and borax to heated glycerine) and substances yielding boric acid in the reaction mixture such as boron triacetate. It is to be understood that the term boric acid shall include compounds which yield it in the preparation of the hardener concentrate.

Of course, a hardening agent must be incorporated. Among those which operate most satisfactorily are simple salts of aluminum or aluminum salts which are soluble in alcohols. Examples are aluminum chloride, aluminum bromide, aluminum sulfate and aluminum nitrate. The sulfate and nitrate give a concentrate of better properties if used in somewhat dilute solution; i. e., concentrates which contain a somewhat higher content of alcohol such as glycol or glycerine.

While my invention is not limited to the use of additional solvents, I have found in some cases that their addition confers beneficial effects, thus the addition of aliphatic alcohols such as methyl alcohol, ethyl alcohol, ethylene glycol, glycerine, diethylene glycol, triethylene glycol, or tetraethylene glycol increases the stability of the concentrate without causing precipitation.

It is also recognized that good hardening action results from the presence of an acid in the hardener, and I consequently contemplate the presence of such materials in my concentrated hardener. However, this constitutes a preferred embodiment to which my invention is not limited. I prefer to have the acid present in amounts sufficient to cause a pH of 3.0 to 6.5 in the concentrate. I have found that with most of the concentrates a pH below 4.5 results in poorer keeping qualities whereas with a pH above 7 a precipitate forms when the concentrate is added to a fixing bath. This precipitate has no harmful effect but certainly does not add to the appearance of the bath. I prefer to utilize acetic or propionic acids. Also known compounds for preventing incrustation and precipitation such as di and tri basic organic acids, citrates, tartrates, urea, glucono-d-lactone, etc., may be added to the concentrate.

It is advantageous to have little water present in the concentrate and I prefer that the added water be less than 5 per cent of the concentrate. Greater amounts of water progressively increase the tendency toward the formation of incrustation. Of course, the chemicals mentioned above frequently contain water of crystallization or the like and as far as I have noticed this small amount of water requires no consideration.

To prepare a photographic bath having hardening properties from my concentrate one part of hardener concentrate is merely added to ten to twenty parts of water. When preparing an acid hardening fixing bath one part of my hardener concentrate is added to about ten to twenty parts of 30 per cent hypo solution. The hardener concentrate, of course, can be added to other photographic baths and can be added to other fixing solutions such as those of ethanolamine thiosulfate, ethylene diamine thiosulfate, guanidine thiosulfate, potassium thiosulfate, ammonium thiosulfate, etc.

Sulfites are a desirable constituent. Their incorporation is preferably accomplished by introducing sulfur dioxide which reacts with hydroxy aliphatic amine to form an amino sulfite. This is particularly desirable when the hardener concentrate is to be added to a fixing bath since other sulfites such as alkali metal sulfites tend to cause a precipitate in the fixing solution. A hardener concentrate not containing a sulfite would sulfurize a fixing solution but would not do so if the hypo solution contained a bisulfite. When the hydroxy aliphatic amine sulfite is used it can be added as such or materials forming it may be added. My invention is not restricted to the presence of sulfites in the concentrate.

Example I

| | Grams |
|---|---|
| Ethanolamine | 425 |
| Boric acid | 100 |
| Acetic acid | 280 |
| Sulfur dioxide | 160 |
| Aluminum chloride | 160 |

Example II

| | Grams |
|---|---|
| Ethanolamine | 400 |
| Ethylene glycol | 200 |
| Boric acid | 100 |
| Acetic acid | 280 |
| Sulfur dioxide | 160 |
| Aluminum chloride | 160 |

Example III

| | Grams |
|---|---|
| Ethanolamine | 400 |
| Ethyl alcohol 95% | 100 |
| Ethylene glycol mono-ethyl-ether | 100 |
| Boric acid | 120 |
| Acetic acid | 260 |
| Sulfur dioxide | 75 |
| Aluminum chloride | 180 |

Example IV

| | Grams |
|---|---|
| 2-amino butanol | 600 |
| Boric acid | 120 |
| Acetic acid | 260 |
| Sulfur dioxide | 75 |
| Aluminum chloride | 180 |

Example V

| | Grams |
|---|---|
| Ethyl alcohol 95% | 100 |
| β-Diethylamino ethyl alcohol | 800 |
| Boric acid | 120 |
| Acetic acid | 260 |
| Sulfur dioxide | 75 |
| Aluminum chloride | 180 |

Example VI

| | | |
|---|---|---|
| Ethanolamine | grams | 425 |
| Boric acid | do | 100 |
| Acetic acid | do | 280 |
| Sulfur dioxide | do | 160 |
| Aluminum chloride | do | 160 |
| Water | cc | 50 |

In each of the foregoing examples the hydroxy aliphatic amine and the boric acid were heated together until dissolved. Acetic acid was then added heat being involved. The mixture was then weighed and the indicated amount of sulfur dioxide was introduced, the amount being determined by weighing the mixture. During the introduction of the sulfur dioxide heat was formed. Aluminum chloride was then added and the mixture heated to increase the rate of solution. This constitutes the preferred mode of preparation but other methods of mixing can manifestly be used; for instance, it is satisfactory to add the acetic acid to the aliphatic hydroxy amine and then add the boric acid. When using this method it is preferred that heating be avoided until the boric acid is added since the material will otherwise darken.

Example VII

| | Grams |
|---|---|
| Ethanolamine 88% | 140 |
| Boric acid | 70 |
| Acetic acid, glacial | 140 |
| Aluminum chloride, cryst | 80 |

Example VIII

| | Grams |
|---|---|
| Ethanolamine 88% | 140 |
| Boric acid | 70 |
| Acetic acid, glacial | 140 |
| Aluminum chloride, cryst | 80 |
| Ethylene glycol | 30 |

In compounding the hardener of Examples VII and VIII, add the boric acid to the ethanolamine and stir the mixture, then add the acetic acid and heat to 300° F. until the boric acid is dissolved; add the aluminum chloride slowly, keeping the temperature at 280° F.±20° F. until all the aluminum chloride is dissolved, then add the ethylene glycol or other solvent. For use add 1 part of hardener to 30 parts of a cool 30 per cent hypo solution containing 1½ per cent sodium bisulfite.

It is impossible to tell what condition the constituents are in after they have been incorporated in the concentrated solution. This is understandable in view of the fact that there are so many constituents which could give rise to a multitude of simple and complex reactions. It is, therefore, to be understood that the constituents as defined in the claims shall include their reaction products if there are such in the finished concentrate.

What I claim is:

1. A concentrated liquid acid hardener which has relatively little tendency to form incrustations comprising a viscous solution containing an hydroxy aliphatic amine sulfite, about 8 to 16 per cent of boric acid and about 12 to 18 per cent of a simple salt of aluminum.

2. A concentrated liquid hardener which has relatively little tendency to form incrustations and which contains less than about 5 per cent water, comprising a viscous solution containing a hydroxy aliphatic amine, about 8 to 16 per cent of boric acid and about 12 to 18 per cent of a simple salt of aluminum.

3. The method of preparing a concentrated liquid acid hardener which comprises forming a solution containing about 8 to 16 per cent of a boron compound, an hydroxy aliphatic amine and an organic acid until substantially dissolved and then adding about 12 to 18 per cent of a hardening compound of aluminum.

4. The method of preparing a concentrated liquid acid hardener which comprises dissolving boric acid in an aliphatic hydroxy amine, adding a member of the group consisting of acetic and propionic acids, passing sulfur dioxide into the mixture, and then adding about 12 to 18 per cent of aluminum chloride, the boric acid being present in the mixture in an amount of about between 8 and 16 per cent.

5. A concentrated liquid hardener which has relatively little tendency to form incrustations comprising a viscous solution containing about 8 to 16 per cent of a boron compound, about 12 to 18 per cent of a simple aluminum salt having hardening properties and a hydroxy aliphatic amine acting as a solvent for the other constituents.

HAROLD D. RUSSELL.